United States Patent [19]

Black et al.

[11] 4,154,191
[45] May 15, 1979

[54] FAULTY STEAM TRAP SIGNAL

[76] Inventors: Vincent P. Black, P.O. Box 72, Forest Park Branch, Dayton, Ohio 45404; Chester E. Zawadzki, 336 Catalina Dr., Pittsburgh, Pa. 15241

[21] Appl. No.: 932,643

[22] Filed: Aug. 10, 1978

[51] Int. Cl.² .................. G01K 11/06; G01K 11/08
[52] U.S. Cl. .................................. 116/218; 116/264; 116/173
[58] Field of Search ............... 116/114.5, 173, 114 Y, 116/114 Z, 114 R, 117 R; 73/358, 349, 347, 346, 343 R; 340/590

[56] References Cited

U.S. PATENT DOCUMENTS

| 1,387,890 | 8/1921 | Kleidman | 116/114.5 |
| 1,720,792 | 7/1929 | Johnson | 73/343 R |
| 1,779,463 | 10/1930 | Conner | 116/114.5 |
| 2,263,388 | 11/1941 | Keller | 73/343 R |
| 3,641,693 | 2/1972 | Pinnow | 116/173 |

FOREIGN PATENT DOCUMENTS 536521  10/1931  Fed. Rep. of Germany ........ 116/114.5

Primary Examiner—S. Clement Swisher
Assistant Examiner—Denis E. Corr
Attorney, Agent, or Firm—William J. Ruano

[57] ABSTRACT

A signal device for detecting a faulty steam trap and the like by being responsive to the temperature of steam flow in a pipe. The signal device is a spring wire looped on one end around the pipe and normally connected, at the other end, to the pipe by a metal pellet of low melting point. Upon attainment of a predetermined pipe temperature from steam flow, the pellet will melt and release said wire which spring to a vertical position. The wire carries a signal that can be seen at a distance to denote abnormally high temperature caused by steam flow.

4 Claims, 4 Drawing Figures

FAULTY STEAM TRAP SIGNAL

This invention relates to a signal arm assembly for detecting the presence of steam flow through a pipe, such as caused by a faulty steam trap, or for generally detecting abnormally high temperature flow of fluid or gas through a pipe.

Devices have been used in the past for measuring or detecting flow of fluid through pipes. However, they have had the disadvantage of being complicated and expensive in construction and not giving a truly visual signal upon reaching of a predetermined pipe temperature.

An object of our invention is to provide a novel signal arm assembly which will overcome the above-named disadvantages of prior devices.

A more specific object of our invention is to provide a signal arm assembly which is of extremely light weight, having a minimum number of parts and being considerably less expensive than devices heretofore used and yet being highly reliable in operation.

Other objects and advantages of the invention will become more apparent from a study of the following description together with the accompanying drawing wherein.

Figure 1:
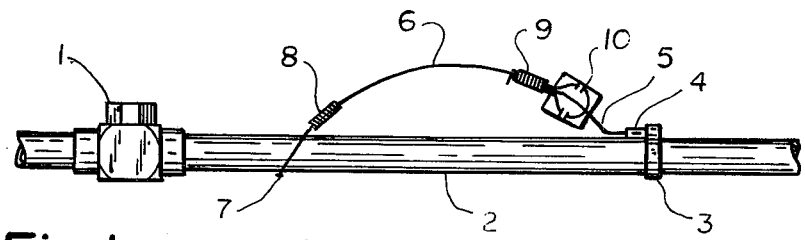
FIG. 1 is an elevational view which shows a signal arm assembly, embodying the present invention, mounted on a pipe to detect the presence of steam and showing the device in the normal position when no steam flow occurs.

Referring more particularly to the drawing, numeral 1 denotes a steam trap and numeral 2 denotes a pipe through which water or other fluid may flow. A metal clip 3, such as a horseshoe shaped spring clip, is clipped around the pipe and holds down on the top portion thereof a low melting point metal pellet 4 in which is embedded the end portion 5 of a spring wire 6. The opposite end 7 of the wire is in the form of a loop snugly encircling the pipe 2. The extreme end portion of the spring wire loop 7 is held in tight lapping engagement with wire 6 by a means of a tightly wound helical wire portion 8 which is slidably mounted on wire 6.

Intermediate the length of wire 6 is a separate spring wire loop 12 whose ends are bound together by a second tightly wound helical wire 9 so as to make wire, 12 slidable on wire 6. A signal card 10 has a pair of slit ears 11 which engage opposite loop portions of the wire 12 so as to be supported by the loop and be slid along wire 6 to any desired position by merely sliding the helical wire 9. The signal card 10 may be of plastic and brightly colored and preferably of fluorescent material.

In operation, when the steam trap 1 operates in a normal manner, there will be no steam flow through pipe 2 and the signal arm assembly will remain in the normal position shown in FIG. 1.

Figure 2:
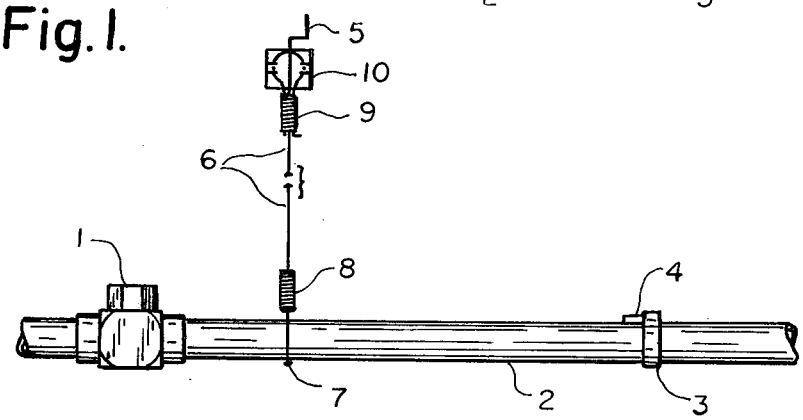
FIG. 2 shows the device, illustrated in FIG. 1, in the operating position as a consequence of steam flow.
Figure 3:
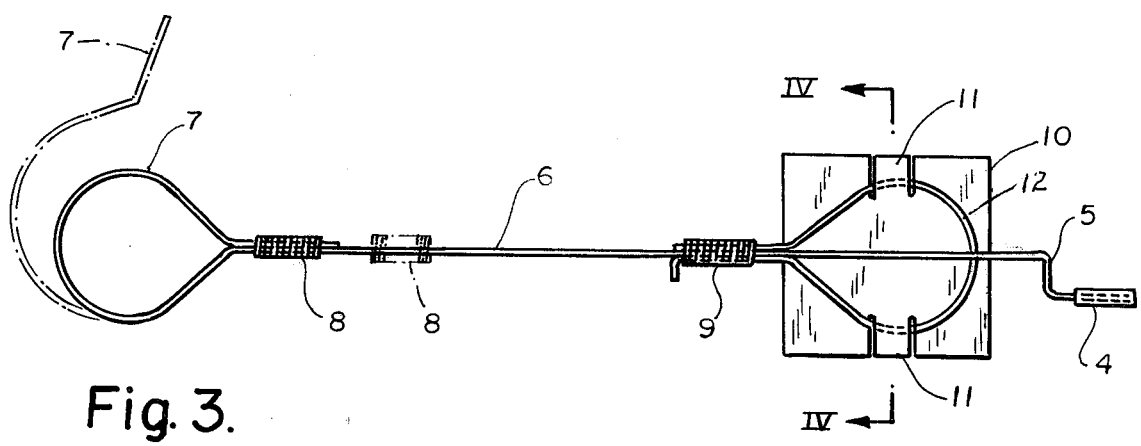
FIG. 3 is an enlarged plan view of the signal alarm assembly.
Figure 4:
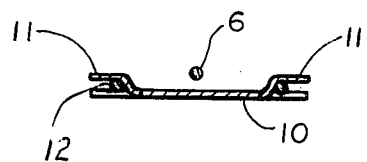
FIG. 4 is a cross-sectional view taken along line IV—IV of FIG. 3.

However, upon the occurrence of a faulty steam trap 1 which gives rise to steam flow through pipe 2, the metal pellet 4 will melt upon the attainment of a predetermined temperature, thereby freeing the end portion 5 and thereby allowing the spring wire 6 to flex vertically upwardly, as shown in FIG. 2, to give a visual indication of the attainment of the abnormally high temperatures of the pipe.

While the invention has been described as detecting faulty steam traps, it may be used also to detect abnormally high temperatures of any fluid flowing through pipe 2.

If desired, instead of separate helical wire 8 the end portion of loop 7 may be spirally wound about wire 6. Wire 12 may also be anchored to wire 6 by wrapping its end portion tightly therearound.

In the event an audible signal as well as a visual one is desired, a bell and power source (not shown) may be connected in series in a well known manner with the metal clip 3 and wire end 5, which circuit will trigger an alarm by deenergizing a relay as the result of breaking of the circuit in the manner shown in FIG. 2.

Thus it will be seen that we have provided a highly effecient signal device for detecting abnormally high fluid flow temperatures by the use of extremely lightweight, simple and inexpensive parts of commonly used materials so as to provide an item of extremely low cost and yet high reliability for detecting high temperature fluid flow, suchas caused by a faulty steam trap and the like.

While we have illustrated and described several embodiments of our invention, it will be understood that these are by way of illustration only and that various changes and modifications are contemplated in our invention, within the scope of the following claims.

We claim:

1. For use in combination with a pipe, a signal arm assembly for detecting the presence of abnormally high temperature fluid flow, comprising a spring wire haveing one end looped for encircling about the pipe and having a signal flag mounted near the other end, and having the extremity of said other end embedded in a low melting point pellet detachably mounted on said pipe, whereby upon attainment of a predetermined high temperature in the pipe, said pellet will melt and allow the springiness of said wire to spring to position substantially at right angles to said pipe to visably denote, by said flag, the attainment of said abnormally high temperatures.

2. The signal arm assembly recited in claim 1 wherein a separate wire is helically wrapped tightly about said first mentioned looped end of said spring wire.

3. A signal arm assembly as recited in claim 1 wherein said flag comprises a loop of wire having ends which are held together in sliding relationship on said spring wire, said flag having slits to form ears mounted on diametrically opposite portions of said last mentioned loop.

4. A signal arm assembly as recited in claim 3 wherein said flag loop of wire has end portions which are held together by a helical coil around an intermediate portion of said spring wire.

* * * * *